(12) United States Patent
Petersen et al.

(10) Patent No.: US 8,322,157 B2
(45) Date of Patent: Dec. 4, 2012

(54) DE-AERATING FLOW STRAIGHTENER FOR COOLING SYSTEM

(75) Inventors: Cody L. Petersen, Dubuque, IA (US); Richard C. Broessel, Sherrill, IA (US)

(73) Assignee: Deere & Company, Moline, IL (US)

( * ) Notice: Subject to any disclaimer, the term of this patent is extended or adjusted under 35 U.S.C. 154(b) by 696 days.

(21) Appl. No.: 12/548,094

(22) Filed: Aug. 26, 2009

(65) Prior Publication Data

US 2011/0048065 A1 Mar. 3, 2011

(51) Int. Cl.
*F25D 19/00* (2006.01)
*F01P 5/10* (2006.01)
*B01D 19/00* (2006.01)

(52) U.S. Cl. .................. 62/296; 123/41.44; 95/262
(58) Field of Classification Search .............. 62/509, 62/296; 123/41.44; 138/39; 415/193, 209.1; 95/260, 262; 181/220, 221
See application file for complete search history.

(56) References Cited

U.S. PATENT DOCUMENTS

| | | | |
|---|---|---|---|
| 3,682,308 A | 8/1972 | Moon | |
| 5,970,928 A | 10/1999 | Smietanski et al. | |
| 6,694,727 B1 | 2/2004 | Crawley et al. | |
| 6,702,190 B1 | 3/2004 | Nohl et al. | |
| 6,732,680 B1 * | 5/2004 | Beltramo et al. | 123/41.44 |
| 7,086,498 B2 * | 8/2006 | Choi et al. | 181/270 |
| 7,383,795 B2 | 6/2008 | Lawrence et al. | |
| 2002/0159883 A1 | 10/2002 | Simon et al. | |

FOREIGN PATENT DOCUMENTS

WO 8302240 7/1983

OTHER PUBLICATIONS

Solvay Product Data At-6115HS (3_pages)(2003).
Techguys How to Flush Your Radiator (6 pages)(2009).
Flowmeter Positioning Guidelines (2 pages)(2005).
Flow Straightener Dimensions (1 page)(May 26, 2006).
McCrorneter Fsioo Flow Staightener Infomation (1 page) (prior art at least as of Aug. 25, 2009).
Background Information (1 page)(prior art at least as of Aug. 25, 2009).
Ehow Cooling System Article (2 pages)(prior art at least as of Aug. 25, 2009).
McCrometer Flow Straightener Information (1 page)(prior art at least as of Aug. 25, 2009).
Siemens Permutit® Power Products Flow Striagheteners (2 pages)(prior art at least as of Aug. 25, 2009).
McCrometer FS100 Flow Straightener Advantages (1 page)(prior art at least as of Aug. 25, 2009).
McCrometer FS100 Flow Straightener Applications (1 page)(prior art at least as of Aug. 25, 2009).
McCrometer FS100 Flow Straightener How It Works (1 page)(prior art at least as of Aug. 25, 2009).
McCrometer FS100 Flow Straightener Parameters (1 page)(prior art at least as of Aug. 25, 2009).
McCrometer FS100 Flow Straightener Specifications (1 page)(prior art at least as of Aug. 25, 2009).
Permutit® Flow Straightener Drawing (1 page)(prior art at least as of Aug. 25, 2009).
Permutit® Flow Straighteners to Correct Flow Profile for Accurate Flow Measurement (2 pages)(2008).

* cited by examiner

*Primary Examiner* — Chen Wen Jiang

(57) ABSTRACT

A liquid coolant flow straightener is provided for use with a cooling system to at least partially straighten flow of liquid coolant, promoting de-aeration of the liquid coolant.

15 Claims, 7 Drawing Sheets

DE-AERATING FLOW STRAIGHTENER FOR COOLING SYSTEM

FIELD OF THE DISCLOSURE

The present disclosure relates to a cooling system, and, more particularly, to de-aeration of liquid coolant.

BACKGROUND OF THE DISCLOSURE

Liquid coolant in a cooling system, such as for an engine, can become aerated. Aeration of liquid coolant can lead to cavitation of an engine coolant pump, engine erosion due to air in the system, pitting of engine liners, engine overheating, cab HVAC system failures, EGR cooler erosion, and other drawbacks.

Pressurized coolant surge tanks, which pressurize the cooling system to raise the boiling point of the liquid coolant, have been used in cooling systems to de-aerate liquid coolant. A regulatory orifice allows a portion of the liquid coolant to pass through the surge tank for de-aeration. The surge tank has a cap with a pressure-relief valve that allows air under pressure in the surge tank to vent to atmosphere. Compared to non-pressurized coolant overflow tanks, surge tanks are relatively expensive and occupy a fair amount of space on board a vehicle.

SUMMARY OF THE DISCLOSURE

According to an aspect of the present disclosure, there is provided a cooling system. The cooling system has a liquid coolant flow straightener comprising a plurality of straight, liquid coolant through channels flow-parallel with one another and configured to at least partially straighten flow of liquid coolant therethrough, promoting de-aeration of the liquid coolant (as used herein, "straighten" means to make laminar). With such a de-aeration-promoting flow straightener, the cooling system may be configured without a pressurized coolant surge tank. Instead, the cooling system may employ a less expensive and smaller non-pressurized coolant overflow tank. An associated method is disclosed.

The flow straightener may be positioned in a coolant line fluidly coupled to the thermostat and the radiator therebetween and through which liquid coolant flows from the thermostat to the radiator. For example, the flow straightener may be positioned at the thermostat. In such a case, an inlet end of the flow straightener may be indented or otherwise contoured to fit over the thermostat so as to receive the thermostat.

The flow straightener partitions a length of the interior region of the coolant line into the plurality of channels. It may be honeycombed so as to define the channels. Further, it may have a plurality of baffles oriented, for example, at right angles to define the channels.

The above and other features will become apparent from the following description and the attached drawings.

BRIEF DESCRIPTION OF THE DRAWINGS

The detailed description of the drawing refers to the accompanying figures in which.

DETAILED DESCRIPTION OF THE DRAWINGS

Figure 1:
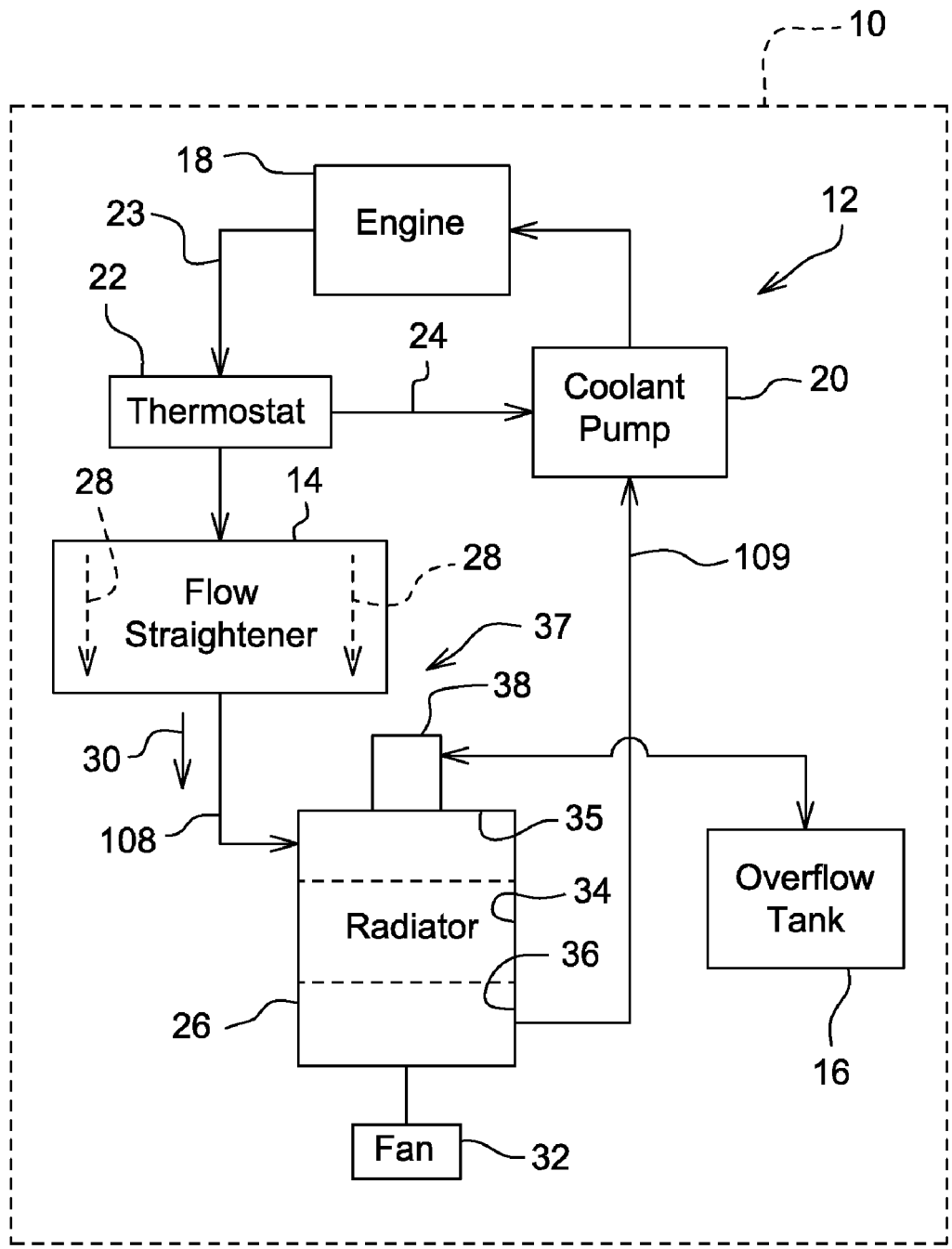
FIG. 1 is a diagrammatic view of a simplified cooling system which includes a liquid coolant flow straightener that promotes de-aeration of liquid coolant.

Referring to FIG. 1, a machine 10 has a cooling system 12. The cooling system 12 has a liquid coolant flow straightener 14 that promotes de-aeration of liquid coolant in the cooling system 12. The cooling system 12 may thus employ a non-pressurized coolant overflow tank 16 instead of a pressurized coolant surge tank, saving space and cost associated with a pressurized coolant surge tank. The flow straightener 14 may be employed on a variety of vehicles. For example, it may be employed on work vehicles such as construction and forestry work vehicles, to name but a few. It may be particularly useful on a skid steer, wheeled or tracked (e.g., all models of John Deere skid steers such as those with John Deere PowerTech™ engine models 4024 or 5030) and other relatively small vehicles with limited space.

The cooling system 12 has liquid coolant that circulates therein to control the temperature of an engine 18 of the machine 10. The liquid coolant may be any suitable liquid coolant such as, for example, a mixture (e.g., 50/50) of water (e.g., distilled water) and ethylene glycol, propylene glycol, or other glycol (e.g., ethylene glycol). A coolant pump 20 advances liquid coolant through the engine 18 which heats the liquid during operation. Below its start-to-open temperature (e.g., 90 degrees Celsius), a thermostat 22 is closed, directing the liquid coolant, supplied from the engine 18 via a line 23, through a bypass line 24 back to the coolant pump 20, which pumps the liquid coolant back through the engine 18. This re-circulation continues until the thermostat 22 starts to open due to temperature.

Upon opening of the thermostat 22 due to temperature, liquid coolant is advanced from the thermostat 22 through the flow straightener 14 to a radiator 26. The flow straightener 14 is thus positioned in a coolant line 37 fluidly coupled to the thermostat 22 and the radiator 26 and through which liquid coolant flows from the thermostat 22 to the radiator 26.

Figure 2:
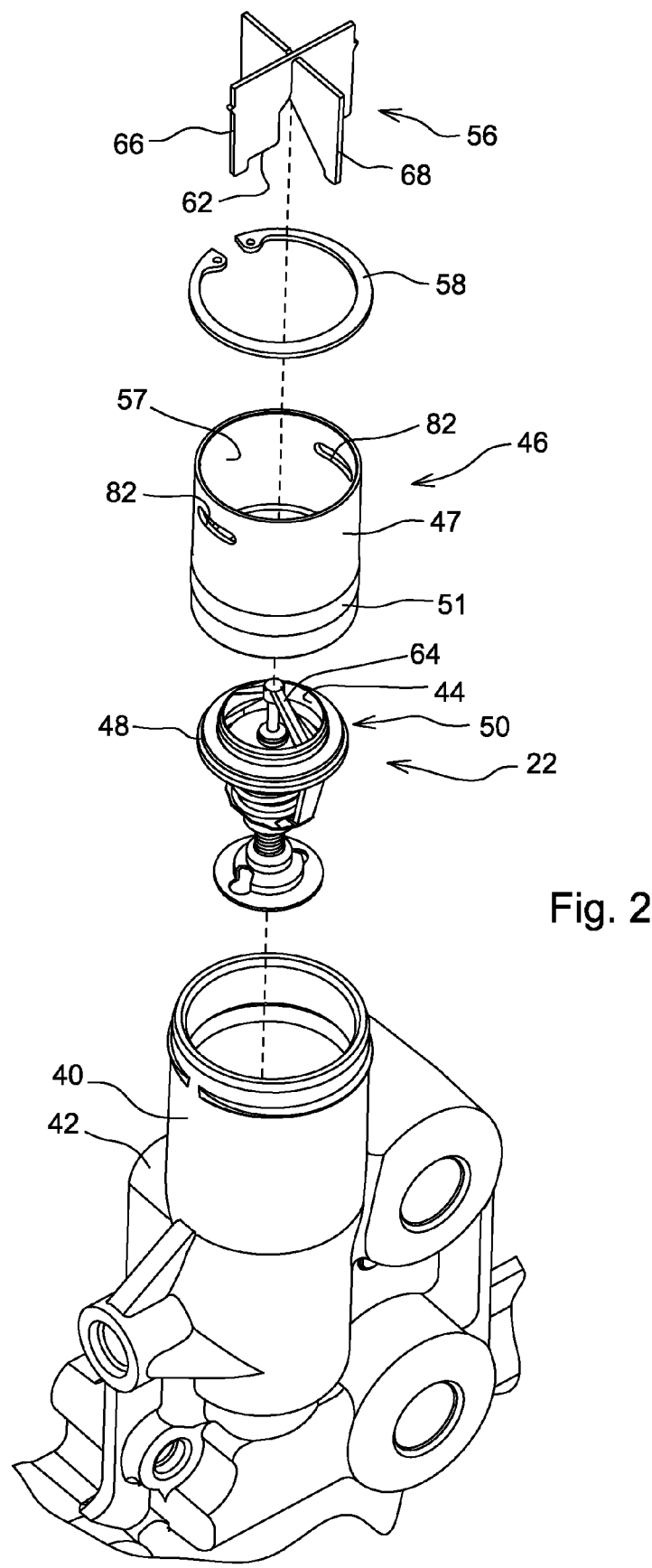
FIG. 2 is a perspective view, with portions broken away, showing a first embodiment of the flow straightener mounted in an outlet.
Figure 3:
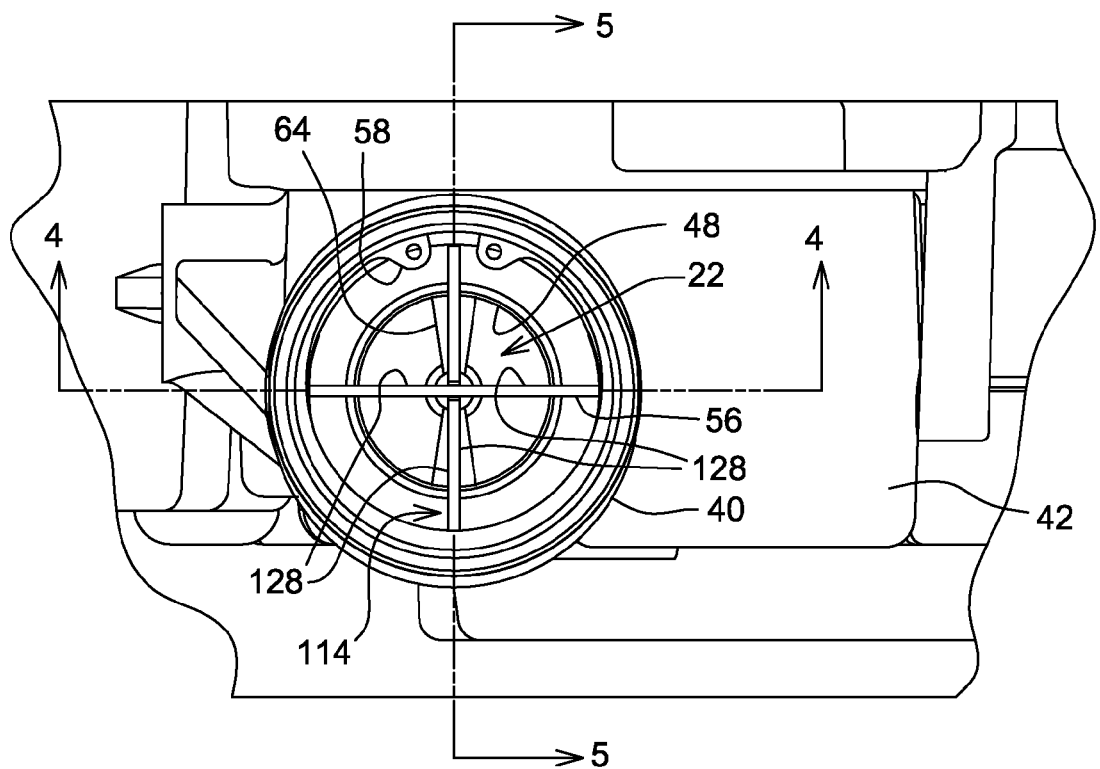
FIG. 3 is an end view showing the first flow straightener mounted in the outlet.
Figure 4:
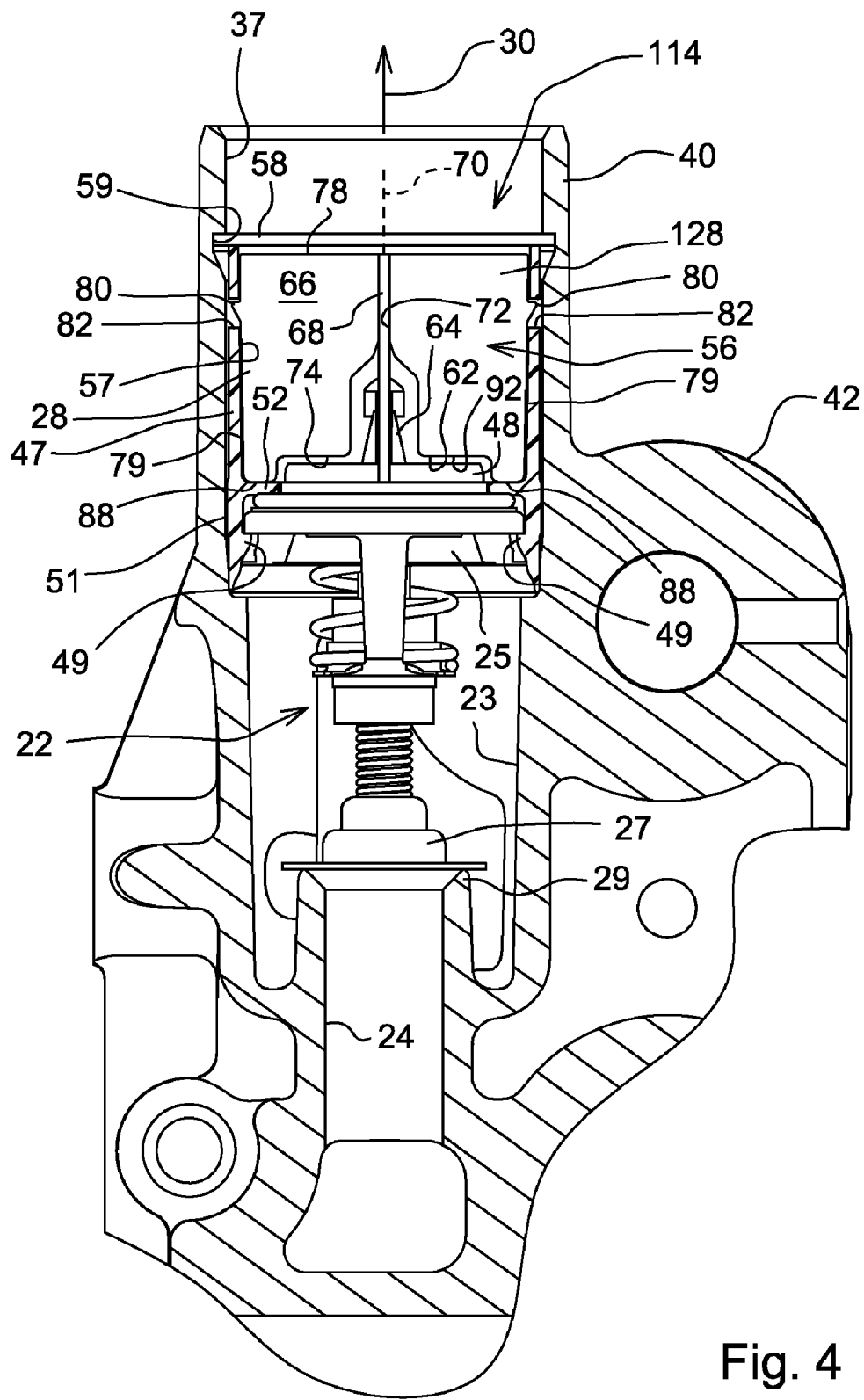
FIGS. 4 and 5 are sectional views taken respectively along lines 4-4 and 5-5 of FIG. 3 showing the first flow straightener positioned at a radiator outlet of a thermostat.
Figure 5:
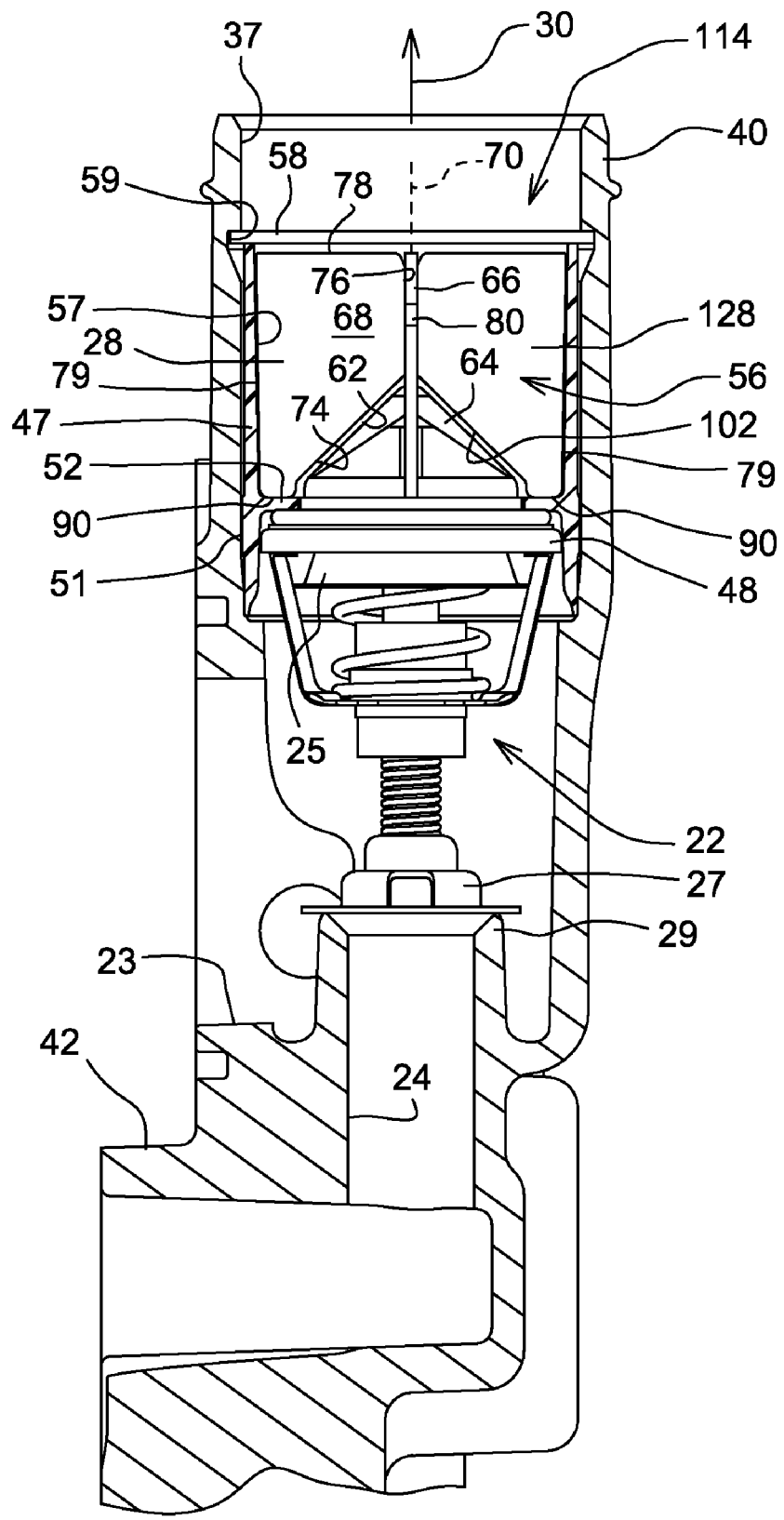

In FIGS. 2, 4, and 5, the thermostat 22 is shown in an opened position, which it would assume when heated. Below its start-to-open temperature, an upper valve member 25 seats against a ring 48 of a frame 50 of the thermostat 22 blocking flow to the radiator 26 while a lower valve member 27 is lifted away from a seat 29 allowing flow to the bypass line 24. When the thermostat 22 assumes the opened position of FIGS. 2, 4, and 5, the upper valve member 25 is unseated from the ring 48 allowing flow to the radiator 26, and the lower valve member 27 seats against its seat 29 restricting flow to the bypass line 24.

The flow straightener 14 has a plurality of straight, liquid coolant through-channels 28 (i.e., each channel open at each of its two opposite ends) which are flow-parallel to one another. As such, liquid coolant is advanced through the channels 28 in a direction 30 away from the thermostat 22 toward the radiator 26 so as to at least partially straighten flow of the liquid coolant, promoting de-aeration of the liquid coolant.

The flow straightener 14 may be honeycombed to define the channels 28. As such, it may be configured as a honeycomb structure that partitions a length of the coolant line 37 into the channels 28. In the honeycomb structure, side-adjacent channels 28 share a common wall. The honeycomb structure may be constructed in a variety of ways.

At the radiator 26, heat is transferred from the liquid coolant to air to cool the liquid coolant. Air may be forced across the radiator 26 by use of a fan 32 of the machine 10. The radiator 26 has a radiator core 34, a top tank 35 mounted atop the core 34, and a bottom tank 36 mounted to the bottom of the core 34, such that liquid coolant flows from an upper radiator hose 108 through the top tank 35, the core 34, and the bottom tank 36 to a lower radiator hose 109.

A radiator cap 38 is coupled to the top tank 35 and includes valving so as to pressurize the cooling system 12 to raise the boiling temperature of the liquid coolant. As the liquid coolant expands due to temperature, valving in the cap 38 will open to allow overflow of liquid coolant from the radiator 26 to the overflow tank 16. Air separated from the liquid coolant vents to the overflow tank 16 and eventually to atmosphere upon such opening of the valving. As the liquid coolant contracts due to cooling, valving in the cap 38 will open to allow return flow of liquid coolant from the overflow tank 16 back to the radiator 26. The coolant overflow tank 16 is thus fluidly coupled to the top tank 35 of the radiator 26. As such, the cooling system 12 is devoid of a pressurized coolant surge tank.

The cooling system 12 may also be used to control the temperature of a passenger compartment of the machine 10. In such a case, the cooling system 12 may also have a heating system (not shown) including a heater core, a fan for blowing air across the heater core into the passenger compartment, and a valve for controlling flow of liquid coolant between the engine and the heater core.

Referring to FIGS. 2-5, in a first embodiment of the flow straightener 14, a liquid coolant flow straightener 114 is positioned in an upright outlet 40 (e.g., outlet tube) of an engine cover 42 at a radiator outlet 44 of the thermostat 22. The cover 42, made, for example, of an aluminum, may be bolted onto an end of the engine block of the engine 18. In the case of an engine 18 oriented in fore-aft relation to the vehicle, the cover 42 may be mounted on the rear of the engine block 18 (in other cases, it may be mounted on the front of the engine block). The coolant pump 20 may be mounted to the cover 42. The flow straightener 114 includes, for example, a tubular carrier 46 received in the outlet 40 and a partition 56 installed in the carrier 46 so as to be mounted thereto. The thermostat 22 may also be mounted to the carrier 46.

During assembly, the ring 48 of the frame 50 of the thermostat 22 is received in and secured to a lower portion of the carrier 46. The ring 48 is pressed past a number of internal bosses 49 of the carrier 46 (e.g., two bosses 49 spaced diametrically apart from one another) projecting radially inwardly from an inner surface of a cylindrical side wall 47 of the carrier 46 near a lower end of the carrier 46 such that a lower portion of the ring 48 is captured between the bosses 49 and an annular lip 52 of the carrier 46 (as a point of clarification in the drawings, a gasket on the lower portion of the ring 48 is shown in FIGS. 4 and 5 overlapping the bottom flat face of the lip 52 to indicate that the gasket would be compressed against the lip 52 when the ring 48 is captured between the bosses 49 and the lip 52). An upper portion of the ring 48 is received by a through-hole defined by the lip 52.

Once the thermostat 22 is so mounted to the carrier 46, the sub-assembly of the carrier 46 and thermostat 22 is installed into the outlet 40. An annular external boss 51 of the carrier 46 projecting radially outwardly from the side wall 47 engages an inner surface of the outlet 40 so as to form an interference relationship therewith.

A partition 56 of the flow straightener 114 is then installed into the interior region 57 of an upper portion of the carrier 46, after which a snap ring 58 (made, for example, of a steel) is installed into a groove 59 of the outlet 40 to retain in the outlet 40 the carrier 46, the partition 56, and the thermostat 22. The upper radiator hose 108 may thereafter be clamped to the outlet 40 and to the inlet of the top tank 35 (if not already) so as to interconnect the outlet 40 and the top tank inlet. The flow straightener 114 is thus positioned in the coolant line 37 fluidly coupled to the thermostat 22 and the radiator 26 and through which liquid coolant flows from the thermostat 22 to the radiator 26. In this example, the coolant line 37 includes the outlet 40 and the upper radiator hose 108 (e.g., length of hose 108 is 600 millimeters).

With the partition 56 installed, the flow straightener 114 is honeycombed so as to have straight, liquid coolant through-channels 128 flow-parallel with one another and configured to at least partially straighten flow of liquid coolant therethrough, promoting de-aeration of the liquid coolant. As such, the flow straightener 114 is configured as a honeycomb structure that partitions a length of the coolant line 37 into the channels 128, side-adjacent channels 128 sharing a common wall.

The flow straightener 114 thus exemplarily includes the tubular carrier 46 and the partition 56 which is positioned within the carrier 46 and partitions the interior region 57 of the carrier 46 into the channels 128. Illustratively, the carrier 46 and the partition 56 are distinct components. In other embodiments, the carrier 46 and the partition 56 may be integrated with one another so as to form a single component. In the case where the partition 56 and carrier 46 are distinct as in the straightener 114, the partition 56 may be made of a metal (e.g., a conventional steel or other suitable steel), and the carrier 46 may be made of molded plastic (e.g., conventional molded plastic or other suitable molded plastic such as AMODEL® AT-6115HS of Solvay Advanced Polymers, L.L.C. which is a 15% glass-fiber reinforced, toughened grade of polyphthalamide resin). In the case where the partition 56 and carrier 46 are integrated, the straightener 114 may be made, for example, of a metal (e.g., a conventional steel or other suitable steel) or molded plastic (e.g., conventional molded plastic or other suitable molded plastic such as AMODEL® AT-6115HS). The materials of the straightener 114 are to be suitable for use in a coolant system.

The partition 56 may include a plurality of baffles or other partition elements that cooperate to define walls of the channels 128. The baffles may intersect at right angles. Exemplarily, the partition 56 has exactly two baffles, a first baffle 66 and a second baffle 68, that intersect at right angles along a central axis 70 of the flow straightener 114 and the coolant line 37 such that the flow straightener 114 has exactly four channels 128. In such a case, the baffles 66, 68 are arranged in a plus ("+") shape in an end view of the flow straightener 114 (FIG. 3) such that the baffles 66, 68 extend along a diameter of the carrier 46 as diametral chords thereof. Each channel 128 is thus defined by portions of the carrier 46, the first baffle 66, and the second baffle 68.

Figure 6:
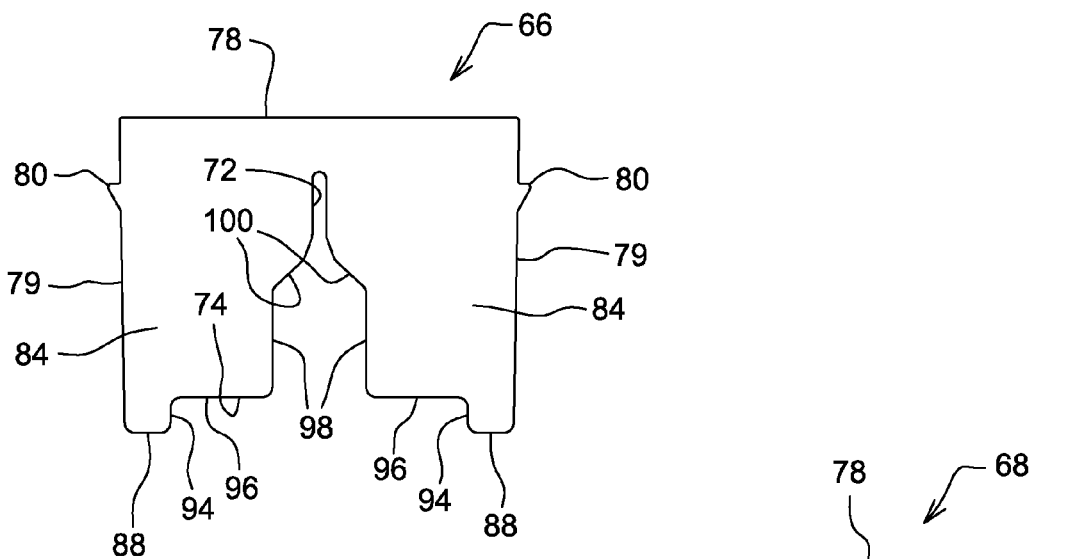
FIG. 6 is an elevation view of a first baffle of the first flow straightener.
Figure 7:
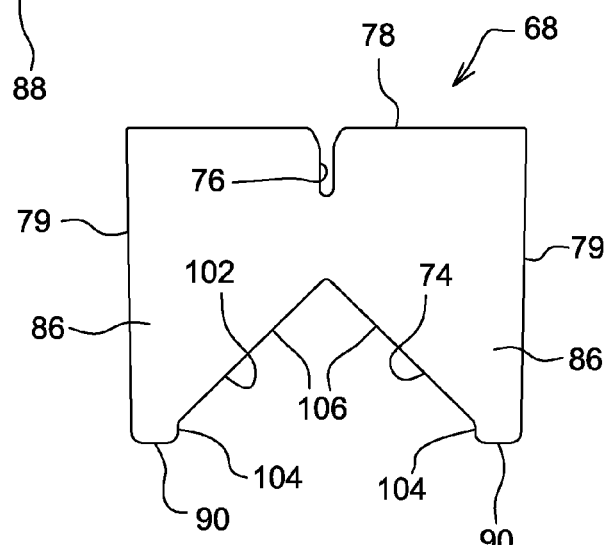
FIG. 7 is an elevation view of a second baffle of the first flow straightener.

Referring to FIGS. 6 and 7, the baffles 66, 68 are coupled together to form the partition 56 prior to installation in the carrier 46. Illustratively, they are configured as distinct plates made, for example, of a steel (e.g., a conventional steel)

suitable for use in a coolant system. The first baffle 66 has a blind axial first slot 72 open at and extending from a peripheral inlet edge 74 of the first baffle 66. The second baffle 68 has a blind axial second slot 76 open at and extending from a peripheral outlet edge 78 of the second baffle 68.

The baffles 66, 68 are press-fit together so as to form an interference relationship. The first baffle 66 is received in the second slot 76, and the second baffle 68 is received in the first slot 72. Exemplarily, the thickness of the baffles 66, 68 (e.g., 1.5 millimeters) is greater than the width of the slots 72, 76 (e.g., 1.2 millimeters).

After being so formed, the partition 56 is inserted into the carrier 46 such that the partition 56 fits snugly in the carrier 46. Each of the first and second baffles 66, 68 may have tapering opposite peripheral side edges 79, matching a slight taper of the mold draft profile of the inner surface of the side wall 47 of the carrier 46 (such taper of the inner surface facilitating removal of the carrier 46 from its mold during manufacture). Accordingly, with respect to each baffle 66, 68, each side edge 79 and the outlet edge 78 cooperates to define an angle of, for example, 89° therebetween to define the taper between the side edges 79 of that baffle 66, 68.

The first baffle 66 has a partition retainer to retain the partition 56 in the interior region 57 of the carrier 46. Exemplarily, the partition retainer has a barb 80 on each of the side edges 79 of the baffle 66. The carrier 46 has two holes 82 formed in the side wall of the carrier 46 and receiving respectively the barbs 80 upon insertion of the partition 56 into the interior region 57 of the carrier 46. The holes 82 are configured, for example, as slots the ends of which may be engaged by the barbs 80 so as to block any excessive rotation of the partition 56 relative to the carrier 46.

An inlet end 62 of the partition 56 is contoured to fit over and thus receive the thermostat 22. The inlet end 62 is indented such that the inlet end 62 receives the thermostat 22, in particular the ring 48 and an arch 64 of the thermostat frame 50.

The first baffle 66 has a pair of symmetrical legs 84, and the second baffle 68 has a pair of symmetrical legs 86. The legs 84, 86 have feet 88, 90, respectively, that stand on the lip 52. In so doing, the legs 84, 86 straddle the thermostat 22. In particular, the first and second legs 84 of the first baffle 66 straddle the arch 64 of the thermostat 22 transversely to the arch 64. The first and second legs 86 of the second baffle 68 straddle the arch 64 so as to extend longitudinally along the arch 64.

The legs 84 of the first baffle 66 cooperate to define a notch 92 in the inlet edge 74 of the first baffle 66. The notch 92 is stepped to fit over the ring 48 and the arch 64 while maximizing the surface area of the baffle 66 for straightening of the flow. Along each leg 84, the inlet edge 74 recesses axially from a foot 88 (i.e., a first step) of the leg 84 along a first axial edge portion 94 to a second step 96 of the leg 84 in order to receive the ring 48 of the thermostat frame 50 in the thus-formed recessed portion of the notch 92. The second step 96 extends laterally inwardly to a second axial edge portion 98 extending axially to a diagonal edge portion 100. The diagonal edge portion 100 extends axially and laterally inwardly. The recessed portion of the notch 92 formed by the second axial edge portions 98 of the legs 84 and the diagonal edge portions 100 of the legs 84 receives the arch 64 of the thermostat frame 50. The diagonal edge portions 100 cooperate to provide a V-shaped portion of the notch 92 extending transversely over the peak of the arch 64. The first slot 72 extends axially from the vertex of that V-shaped portion.

The legs 86 cooperate to define a notch 102 in the inlet edge 104 of the second baffle 68. The notch 102 is primarily V-shaped to fit over and extend longitudinally along the arch 64. It is stepped initially from the feet 90 to receive the ring 48. Along each leg 86, the inlet edge 104 recesses axially from a foot 90 (i.e., a step) of the leg 86 along a first axial edge portion 104 in order to receive the ring 48 in the thus-formed recessed portion of the notch 102. A diagonal edge portion 106 then extends axially and laterally inwardly. The recessed portion of the notch 102 formed by the diagonal edge portions 106 of the legs 86 receives the arch 64. The diagonal edge portions 106 cooperate to provide a V-shaped portion of the notch 92 extending longitudinally along and over the arch 64.

Once the partition 56 has been installed, the snap ring 58 is fitted into the groove 59 so as to engage the top of the carrier 46. The snap ring 58, or other straightener retainer, retains the flow straightener 114 axially in place in the outlet 40. Engagement between the snap ring 58 and the top of the carrier 46 and engagement between the carrier 46 and the outlet 40 cooperate to inhibit rotation of the straightener 114.

When the thermostat 22 is at least partially open, the pump 20 will advance liquid coolant in the direction 30 from the outlet 44 of the thermostat 22 through the channels 128 of the flow straightener 114 and the hose 108 to the top tank 35 of the radiator 26. The flow straightener 114 at least partially straightens the flow of liquid coolant, promoting de-aeration of the liquid coolant for collection of the air in the top tank 35 until the air is advanced into the overflow tank 16 for release to atmosphere upon overflow of liquid coolant thereto.

Figure 8:
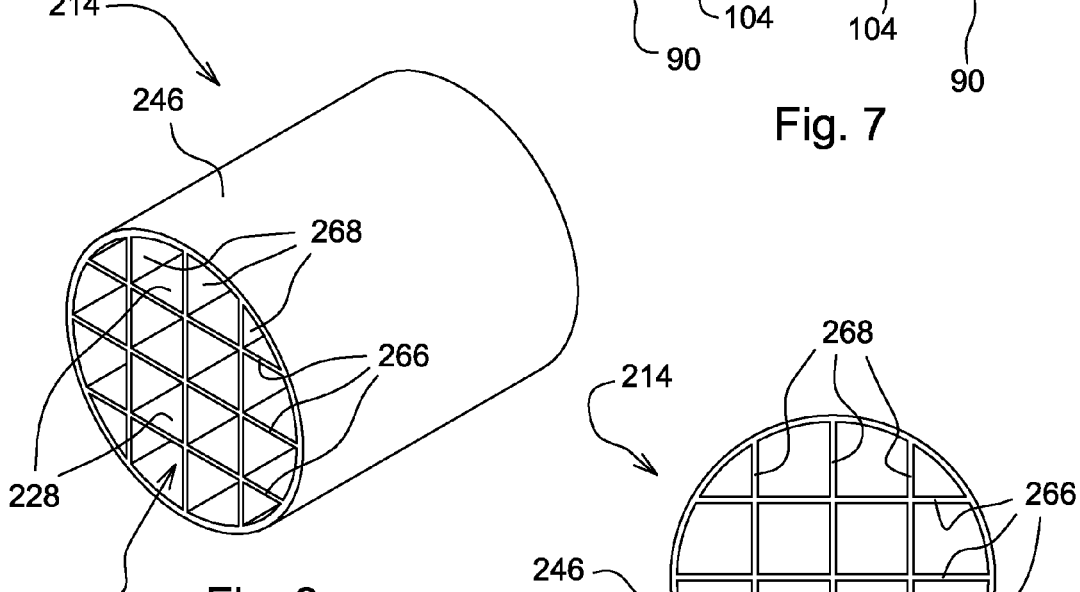
FIG. 8 is a perspective view of a second embodiment of the flow straighter.
Figure 9:
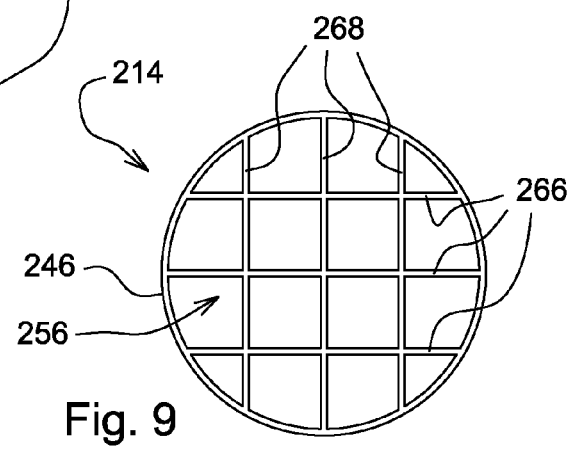
FIG. 9 is an end view of the second flow straighter (inlet end or outlet end)

Referring to FIGS. 8 and 9, in a second embodiment of the flow straightener 14, a liquid coolant flow straightener 214 may be positioned in the coolant line 37, such as in the outlet 40, between the thermostat 22 and the radiator 26. The flow straightener 114 is honeycombed so as to have straight, liquid coolant through-channels 228 flow-parallel with one another and configured to at least partially straighten flow of liquid coolant therethrough, promoting de-aeration of the liquid coolant. As such, the flow straightener 214 is configured as a honeycomb structure that partitions a length of the coolant line 37 into the channels 228, side-adjacent channels 228 sharing a common wall.

Illustratively, the flow straightener 214 includes a tubular carrier 246 and a partition 256 positioned within and integrated with the carrier 246 such that the carrier 246 and partition 256 form a single component. In other embodiments, the partition 256 and carrier 246 may be distinct components. In the case where the partition 256 and carrier 246 are integrated, the straightener 214 may be made, for example, of a metal (e.g., a conventional steel or other suitable steel) or molded plastic (e.g., conventional molded plastic or other suitable molded plastic such as AMODEL® AT-6115HS). In the case where the partition 256 and carrier 246 are distinct, the partition 256 may be made of a metal (e.g., a conventional steel or other suitable steel), and the carrier 246 may be made of molded plastic (e.g., conventional molded plastic or other suitable molded plastic). The materials of the straightener 214 are to be suitable for use in a coolant system.

The partition 256 includes a plurality of baffles that cooperate to define the walls of the channels 228. Exemplarily, the partition 256 has exactly six baffles, three horizontal baffles 266 and three vertical baffles 268 as viewed in FIG. 9. The horizontal and vertical baffles 266, 268 intersect at right angles. All of the baffles 266, 268 are chords of the carrier 246, with two being diametral chords extending along the central axis 70. The flow straightener 214 thus has exactly 16 channels 214. The four middle channels 214 are rectangular (e.g., square) in an end view and are defined by respective baffles 266, 268, and the eight outer channels 214 are defined by respective baffles 266, 268 and the carrier 246.

The inlet end of the flow straightener 214 may or may not be contoured to receive the thermostat 22. In the case where the flow straightener 214 is positioned at the radiator outlet 44 of the thermostat 22, the inlet end of the flow straightener 214 or, more particularly, the baffles 266, 268 of its partition 256 may be indented or otherwise contoured to fit over the thermostat 22, such as the arch 64 and ring 48 thereof. In the case where the flow straightener 214 may not be positioned so close to the thermostat 22, the inlet end of the flow straightener may not be indented. Rather, the inlet and outlet ends of the flow straightener 214 may both be flat so as to be configured the same as one another, one such end shown, for example, in FIGS. 8 and 9.

Referring to FIGS. 10a-10d, in another embodiment of the flow straightener 14, a flow straightener 314 may have a carrier 346 and a 5×5 partition 356 positioned therein. As a 5×5 partition, the partition 356 has a first set of five evenly spaced baffles 366 arranged in one direction (with the middle baffle of the first set positioned as a diametral chord) and a second set of five evenly spaced baffles 368 arranged at right angles to the first set of baffles (with the middle baffle of the second set positioned as a diametral chord) to define the channels 328 of the flow straightener 314.

The carrier 346 and 5×5 partition 356 may be distinct components or, as illustrated, integrated to form a single component. In the case where the 5×5 partition and carrier are distinct, the partition may be made of a metal (e.g., a conventional steel or other suitable steel), and the carrier may be made of molded plastic (e.g., conventional molded plastic or other suitable molded plastic). In the case where the 5×5 partition and carrier are integrated, the straightener 314 may be made, for example, of a metal (e.g., a conventional steel or other suitable steel) or molded plastic (e.g., conventional molded plastic or other suitable molded plastic such as AMODEL® AT-6115HS). The materials of the straightener 314 are to be suitable for use in a coolant system. In the illustrated, integrated straightener 314, although the top of the partition 356 is shown offset slightly from the top of the carrier 346 (i.e., 0.02 millimeter), it is to be understood that the top of the partition may be even with the top of the carrier 346 rather than be offset.

Figure 10A:
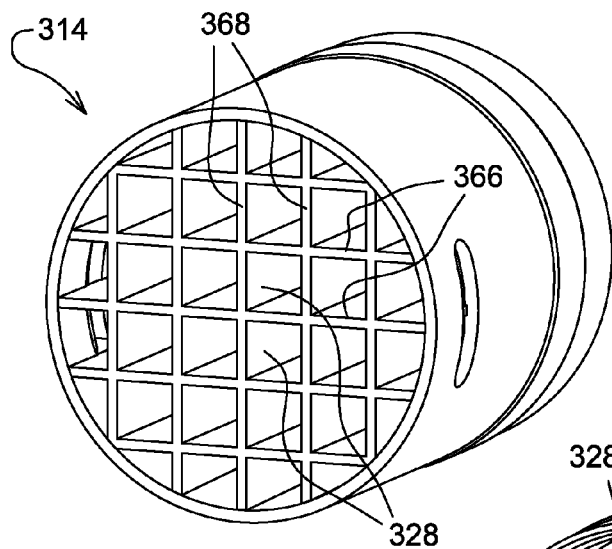
FIGS. 10$a$-10$d$ show a third embodiment of the flow straightener.
Figure 10B:
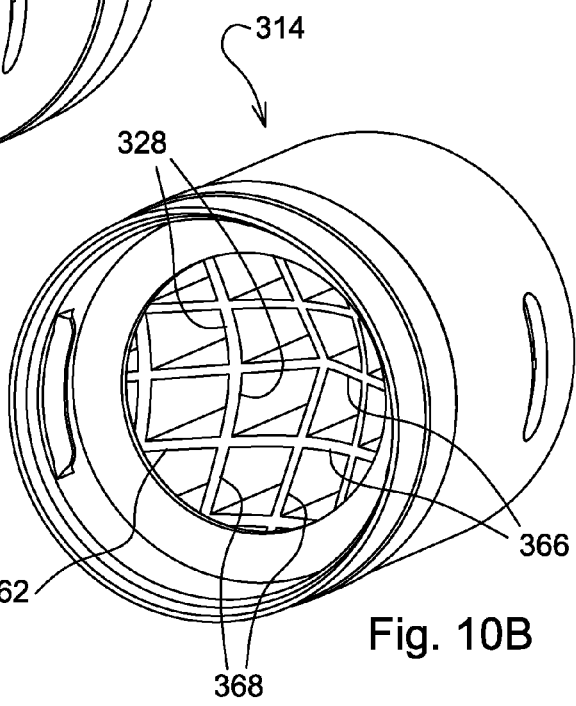
Figure 10C:
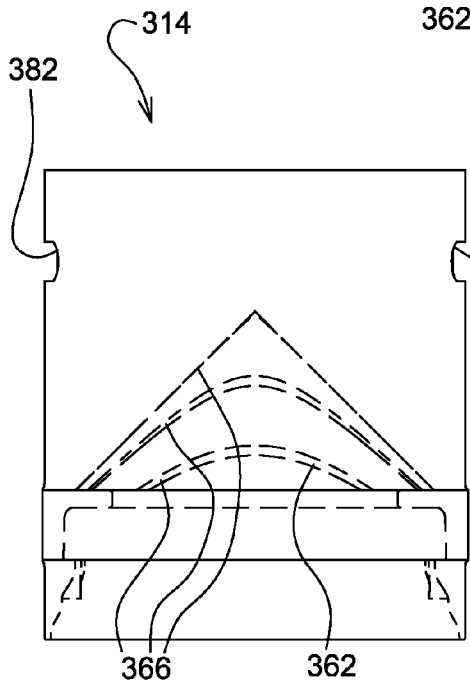
Figure 10D:
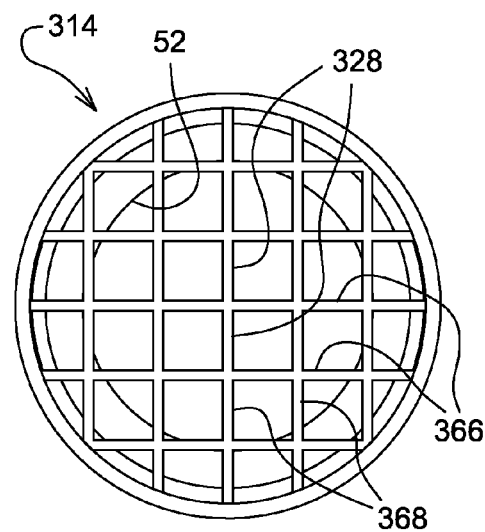

Referring to FIG. 10c, the inlet end 362 of the partition 356 may be indented so as to receive the thermostat 22, in particular the ring 48 and arch 64, the thermostat 22 being secured to the carrier 346 in the manner as discussed above. Exemplarily, the inlet ends of the baffles 366, 368 may be shaped so as to fit over the arch 64 in any angular orientation of the straightener 314. The two diametral baffles of the baffles 366, 368 are V-shaped, such that the vertices of the diametral baffles 366, 368 form a central peak along a central longitudinal axis of the straightener 314. The other, non-diametral baffles of the baffles 366, 368 may be somewhat U-shaped with peaks at successively lower levels in directions away from the central peak.

Illustratively, the carrier 346 has the two holes 82 spaced diametrically apart from one another. Such holes may be used to facilitate removal of the straightener 314 from the outlet 40. In other embodiments, the holes 82 may be eliminated such that the side wall is solid in those areas. The carrier 346 also has two bosses spaced diametrically apart from one another. In other embodiments, it may have four baffles spaced evenly about the inner surface of the side wall of the carrier 346.

Since the four outermost baffles (two baffles 366 and two baffles 368), overlie the lip 52 of the carrier 346 (FIG. 10d), little or no flow may pass through the channels 328 radially outward of those particular baffles. As such, in another embodiment of the flow straightener 14, a flow straightener (not shown) may be configured like the straightener 314 except that the partition may be a 4×4 partition instead of a 5×5, so that more flow may pass through the outermost channels.

In general, the flow straightener 14 may be configured in a variety of ways. Exemplarily, the tubular carrier and partition may be distinct components (e.g., straightener 114) or integrated so as to form a single component (e.g., straightener 214 or 314). Further, the carrier may be distinct from a conduit of the coolant line in which the straightener is positioned (e.g., straighteners 114, 214) or the straightener may not have a carrier; rather, the conduit may function as the carrier for the partition such that the partition is distinct from or integrated with the conduit so as to partition the interior region thereof into the channels of the straightener.

The material of the straightener is to be suitable for use in a coolant system. For example, in the case where the partition and carrier are distinct (e.g., straightener 114), the partition may be made of a metal (e.g., a conventional steel or other suitable steel), and the carrier may be made of molded plastic (e.g., conventional molded plastic or other suitable molded plastic). In the case where the partition and carrier are integrated (e.g., straightener 214), the straightener may be made, for example, of a metal (e.g., a conventional steel or other suitable steel) or molded plastic (e.g., conventional molded plastic or other suitable molded plastic such as AMODEL® AT-6115HS).

Further, the channel pattern of the straightener may take a variety of forms. In some embodiments, there may be exactly one diametral baffle so as to define exactly two channels. Other embodiments may have two or more baffles arranged as diametral or non-diametral chords of the tubular carrier to define the desired number of channels. The baffles may be oriented at right angles or at some other angle to achieve the desired shape of the channels. The baffles may not be chords of the carrier but may simply define a common wall between side-adjacent channels, as may be the case with a variety of polygonal shapes (pentagonal, hexagonal, octagonal, etc.). In other embodiments, the channels may be defined by distinct tubes mounted within the carrier using perforated plates, secured to the carrier and through which the tubes extend, or other mounting structure. A larger number of channels may tend to straighten the flow more effectively, but may result in more cost. The configuration of the flow straightener 114 with its four channels is considered a reasonable solution.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A liquid coolant flow straightener for a cooling system, the flow straightener comprising a plurality of straight, liquid coolant through-channels flow-parallel with one another and configured to at least partially straighten flow of liquid coolant therethrough, promoting de-aeration of the liquid coolant, wherein the flow straightener is honeycombed so as to define the channels, the flow straightener comprises a tubular carrier and a partition positioned within the carrier and partitioning an interior region of the carrier into the channels such that side-adjacent channels share a common wall provided by the partition, the partition comprises a plurality of baffles, the plurality of baffles comprises a first baffle and a second baffle, the first and second baffles intersect at right angles, the first and second baffles are configured respectively as distinct plates, the first baffle comprises a first peripheral side edge, a second peripheral side edge, a first barb on the first peripheral side edge, and a second barb on the second peripheral side edge, the carrier comprises a first hole receiving the first barb and a second hole receiving the second barb.

2. The flow straightener of claim 1, wherein the first baffle comprises a blind axial first slot open at and extending from a peripheral inlet edge of the first baffle, the second baffle comprises a blind axial second slot open at and extending from a peripheral outlet edge of the second baffle, and the first and second baffles are received respectively in the second and first slots.

3. The flow straightener of claim 1, wherein each of the first baffle and the second baffle comprises a notch in a peripheral inlet edge of that baffle to receive the thermostat.

4. A cooling system, comprising a thermostat, a radiator, a coolant line fluidly coupled to the thermostat and the radiator therebetween and through which liquid coolant flows from the thermostat to the radiator, and a liquid coolant flow straightener positioned in the coolant line, the flow straightener comprising a plurality of straight, liquid coolant through-channels flow-parallel with one another and configured to at least partially straighten flow of liquid coolant therethrough, promoting de-aeration of the liquid coolant.

5. The cooling system of claim 4, wherein the flow straightener is honeycombed so as to define the channels.

6. The cooling system of claim 4, wherein the flow straightener is positioned at a radiator outlet of the thermostat.

7. The cooling system of claim 6, wherein an inlet end of a partition of the flow straightener is indented such that the inlet end receives the thermostat.

8. The cooling system of claim 6, wherein the flow straightener comprises a tubular carrier positioned in an outlet and a partition positioned within the carrier and partitioning an interior region of the carrier into the channels such that side-adjacent channels share a common wall provided by the partition, the thermostat is received in and mounted to the carrier, and the partition is indented such that the partition receives the thermostat.

9. The cooling system of claim 8, wherein the partition comprises a plurality of baffles.

10. The cooling system of claim 9, wherein the plurality of baffles comprises a first baffle and a second baffle, and the first and second baffles intersect at right angles.

11. The cooling system of claim 10, wherein the first baffle comprises a first barb on a peripheral first side edge of the first baffle and a second barb on a peripheral second side edge of the first baffle, the carrier comprises a first hole receiving the first barb and a second hole receiving the second barb, each of the first and second baffles is configured as a distinct plate, the first baffle comprises a blind axial first slot open at and extending from a peripheral inlet edge of the first baffle, the second baffle comprises a blind axial second slot open at and extending from a peripheral outlet edge of the second baffle, and the first and second baffles are received respectively in the second and first slots.

12. The cooling system of claim 10, wherein each of the first baffle and the second baffle comprises a notch in a peripheral inlet edge of that baffle, and each notch receives an arch of the thermostat.

13. The cooling system of claim 10, wherein each of the first and second baffles comprises a first leg and a second leg, the first and second legs of the first baffle straddle an arch of the thermostat transversely to the arch; and the first and second legs of the second baffle straddle the arch along the arch lengthwise thereof.

14. The cooling system of claim 4, further comprising a non-pressurized coolant overflow tank, wherein the coolant overflow tank is fluidly coupled to the radiator, and the cooling system is devoid of a pressurized coolant surge tank.

15. A method of de-aerating liquid coolant in a cooling system, the method comprising advancing liquid coolant through a plurality of straight, liquid coolant through-channels, flow-parallel to one another, in a direction away from a thermostat toward a radiator so as to at least partially straighten flow of the liquid coolant, promoting de-aeration of the liquid coolant.

* * * * *